(12) United States Patent
Butcher (10) Patent No.: US 9,081,748 B2
(45) Date of Patent: *Jul. 14, 2015

(54) DYNAMIC REDUNDANCY MANAGEMENT

(71) Applicant: The Boeing Company, Chicago, IL (US)

(72) Inventor: Glenn Gerard Butcher, Colorado Springs, CO (US)

(73) Assignee: The Boeing Company, Chicago, IL (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/924,602

(22) Filed: Jun. 23, 2013

(65) Prior Publication Data

US 2013/0283031 A1    Oct. 24, 2013

Related U.S. Application Data

(63) Continuation of application No. 12/883,567, filed on Sep. 16, 2010, now Pat. No. 8,560,885.

(51) Int. Cl.
| | |
|---|---|
| *G06F 15/177* | (2006.01) |
| *G06F 11/00* | (2006.01) |
| *G06F 11/14* | (2006.01) |
| *G06F 11/20* | (2006.01) |

(52) U.S. Cl.
CPC .............. *G06F 15/177* (2013.01); *G06F 11/00* (2013.01); *G06F 11/1438* (2013.01); *G06F 11/1482* (2013.01); *G06F 11/2005* (2013.01); *G06F 11/2015* (2013.01); *G06F 11/2035* (2013.01)

(58) Field of Classification Search
CPC ..................... G06F 11/2005; G06F 11/2015
USPC ........................................................... 714/11
See application file for complete search history.

(56) References Cited

U.S. PATENT DOCUMENTS

| | | | | |
|---|---|---|---|---|
| 4,634,110 | A  * | 1/1987  | Julich et al. | 714/11 |
| 5,964,887 | A  * | 10/1999 | Conseil | 714/11 |
| 6,804,794 | B1 * | 10/2004 | Robidoux et al. | 714/5.11 |
| 7,124,183 | B2 * | 10/2006 | Pekary et al. | 709/224 |
| 7,305,487 | B2 * | 12/2007 | Blumrich et al. | 709/238 |
| 7,412,291 | B2   | 8/2008  | Judd et al. | |
| 7,890,663 | B2   | 2/2011  | Millet | |

(Continued)

OTHER PUBLICATIONS

Butcher, "Dynamic Redundancy Management," U.S. Appl. No. 12/883,567, filed Sep. 16, 2010, 43 pages.

(Continued)

*Primary Examiner* — Kamini Patel
(74) *Attorney, Agent, or Firm* — Yee & Associates, P.C.

(57) ABSTRACT

The different advantageous embodiments comprise a system for redundancy management of a computing system comprising a number of processors, a number of service managers executable on the number of processors, and a configuration module. The number of processors is associated with a number of processor groups. Each service manager is capable of being configured as a primary service manager adapted to manage a number of commands. Each command is operative to execute a program on one or more of the number of processors. The configuration module is in communication with the number of service managers to control operational redundancies of the computing system. Each primary service manager executes one or more programs on the one or more processors included in different processor groups of the number of processor groups.

18 Claims, 7 Drawing Sheets

(56) References Cited

U.S. PATENT DOCUMENTS

| | | | |
|---|---|---|---|
| 8,239,553 | B2 | 8/2012 | Mannar |
| 8,260,492 | B2 | 9/2012 | Stange et al. |
| 8,560,885 | B1* | 10/2013 | Butcher ................ 714/11 |
| 2002/0009098 | A1* | 1/2002 | Staiger ................ 370/445 |
| 2006/0156053 | A1* | 7/2006 | Judd et al. ................ 714/4 |
| 2006/0265519 | A1* | 11/2006 | Millet ................ 709/251 |
| 2007/0033435 | A1* | 2/2007 | Stange et al. ................ 714/15 |
| 2007/0067354 | A1* | 3/2007 | Mullender et al. ............ 707/201 |
| 2007/0156432 | A1* | 7/2007 | Mueller et al. ................ 705/1 |
| 2007/0156641 | A1* | 7/2007 | Mueller et al. ................ 707/2 |
| 2007/0226785 | A1* | 9/2007 | Chow et al. ................ 726/8 |
| 2009/0271471 | A1* | 10/2009 | Mannar ................ 709/202 |

OTHER PUBLICATIONS

Office Action, dated Dec. 31, 2012, regarding U.S. Appl. No. 12/883,567, 23 pages.

Bolduc, "X-33 Redundancy Management System", IEEE Aerospace and Electronic Systems Magazine, vol. 16, No. 5, May 2001, pp. 23-28.

Lussier et al., "On Fault Tolerance and Robustness in Autonomous Systems", Proceedings of the 3d IARP-IEEE/RAS-EURON Joint Workshop on Technical Challenges for Dependable Robots in Human Environments, Sep. 2004, 7 pages.

Mostefaoui et al., "A Hybrid Approach for Building Eventually Accurate Failure Detectors", Proceedings of the 10th IEEE Pacific Rim International Symposium on Dependable Computing (PRDC'04), Mar. 2004, pp. 57-65.

Powell et al., "Redundancy Management in an Automatic Subway Line: a Protocol based on the Timed Asynchronous Model", 31st Spring School on Theoretical Computer Science: Distributed Algorithms, May 2003, 110 pages.

Sklaroff, "Redundancy Management Technique for Space Shuttle Computers", IBM Journal of Research and Development, vol. 20, No. 1, Jan. 1976, pp. 20-28.

Notice of allowance dated Jun. 7, 2013 regarding U.S. Appl. No. 12/883,567, 15 pages.

\* cited by examiner

CONFIGURATION FILE
500

502 — [groups]
 506 — any = one, two, three, four, five, six, seven, eight
 508 — power 1 = one, two, three, four
 510 — power 2 = five, six, seven, eight
 512 — Interface1 = one
 514 — Interface2 = eight 504 — [redundancies]
 516 — power = power1, power2
 518 — next = any
 520 — next2 = any, any
 522 — Interface = interface1, interface2

DYNAMIC REDUNDANCY MANAGEMENT

This application is a continuation application of U.S. patent application Ser. No. 12/883,567, filed Sep. 16, 2010; the status is pending.

This invention was made with United States Government support under Agreement No. HQ0147-09-C-0008 awarded by DARPA. The Government has certain rights in the invention.

BACKGROUND INFORMATION

1. Field

The present disclosure relates generally to a data processing system and more particularly to data management. Still more particularly, the present disclosure relates to redundancy management in data processing systems.

2. Background

High-availability computing cluster solutions have historically focused on failure recovery, where upon failure of the primary service provider computer program, some time has to be spent transitioning to the backup service provider computer program. During this transition time, the critical service can be unavailable to requesting computer programs. Further, distribution of running instances of computer programs across a computing cluster should take into account the redundant characteristics and limitations of the cluster hardware so that the failure of any single hardware component does not render the service provided by the redundant computer programs unavailable. This distribution of instances should take into account the operable state of the cluster, that is, in the face of component failures the distribution of instances should use the remaining hosts respecting the residual redundancy.

Therefore, it would be advantageous to have a method and apparatus that addresses one or more of the issues discussed above.

SUMMARY

The different advantageous embodiments comprise a system for redundancy management of a computing system comprising a number of processors, a number of service managers executable on the number of processors, and a configuration module. The number of processors is associated with a number of processor groups. Each service manager is capable of being configured as a primary service manager adapted to manage a number of commands. Each command is operative to execute a program on one or more of the number of processors. The configuration module is in communication with the number of service managers to control operational redundancies of the computing system. Each primary service manager executes one or more programs on the one or more processors included in different processor groups of the number of processor groups.

The different advantageous embodiments further comprise a method for redundancy management. A request is received from a configuration module by a service manager executing on a processor. A command message is generated having instructions to respond to the command received. A determination is made as to whether a token exists to allow the command message generated to be transmitted. The token designates the service manager as a primary service manager. In response to a determination that the token exists, the command message is transmitted to a control module of the service manager.

The different advantageous embodiments further comprise a system for dynamic allocation of programs based on redundancy groups comprising a number of service managers and a number of processors. The number of service managers is configured to manage a number of commands for executing a number of programs. Each of the number of service managers receives a command sent from a configuration module to execute a program in the number of programs, generates a control message having instructions to respond to the command received, and determines whether a token exists to allow the control message generated to be transmitted. The number of processors is configured to execute the number of service managers. Each of the processors in the number of processors is associated with a processor group in a number of processor groups. Each processor group in the number of processor groups has a processor executing a primary service manager. The primary service manager for the each processor group transmits the control message generated to a first processor unit to execute the program from the command.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
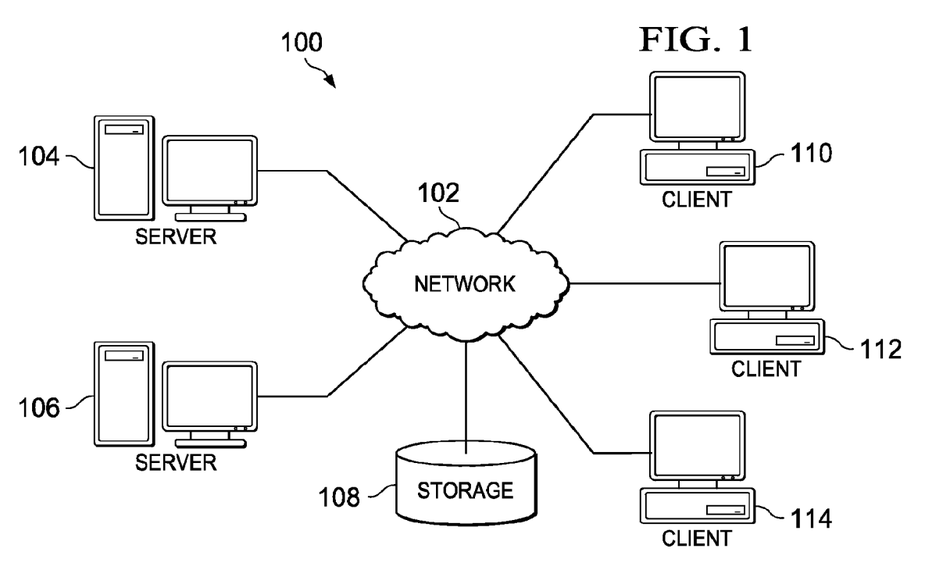
FIG. 1 is an illustration of a network of data processing systems in which an advantageous embodiment may be implemented.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
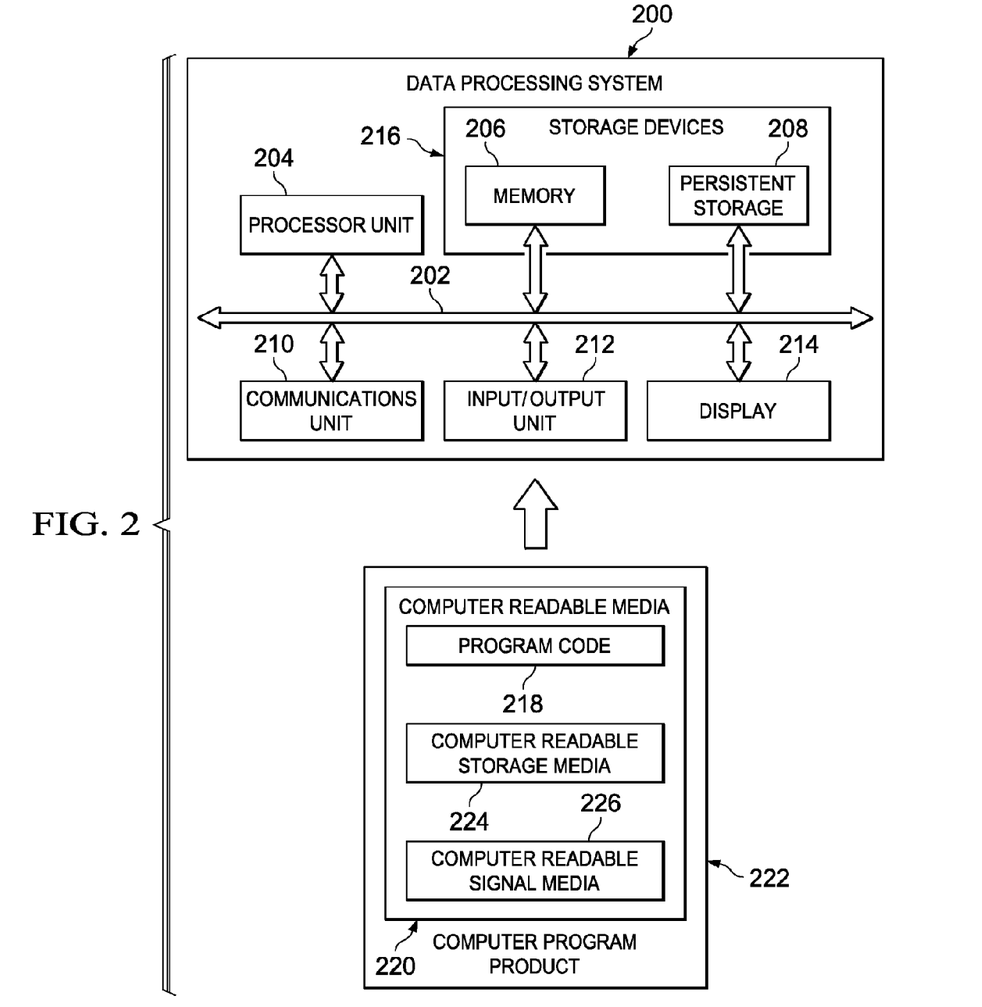
FIG. 2 is an illustration of a data processing system in accordance with an advantageous embodiment.

Turning now to FIG. 2, an illustration of a block diagram of a data processing system is depicted in accordance with an advantageous embodiment. Data processing system 200 is an example of a data processing system that may be used to implement servers and clients, such as server 104 and client 110 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, a shared processor, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account that current solutions do not recognize the specific hardware redundancy, and compel system architects to build specific mechanisms and process allocations to support the use of redundant hardware. Current methods use specific allocation of processes and threads at design time, and develop custom mechanisms for failover. These solutions are product-specific and the fault tolerance typically involves some sort of failover latency.

Thus, the different advantageous embodiments comprise a system for redundancy management of a computing system comprising a number of processors, a number of service managers executable on the number of processors, and a configuration module. The number of processors is associated with a number of processor groups. Each service manager is capable of being configured as a primary service manager adapted to manage a number of commands. Each command is operative to execute a program on one or more of the number of processors. The configuration module is in communication with the number of service managers to control operational redundancies of the computing system. Each primary service manager executes one or more programs on the one or more processors included in different processor groups of the number of processor groups.

The different advantageous embodiments further comprise a method for redundancy management. A request is received from a configuration module by a service manager executing on a processor. A command message is generated having instructions to respond to the command received. A determination is made as to whether a token exists to allow the command message generated to be transmitted. The token designates the service manager as a primary service manager. In response to a determination that the token exists, the command message is transmitted to a control module of the service manager.

The different advantageous embodiments further comprise a system for dynamic allocation of programs based on redundancy groups comprising a number of service managers and a number of processors. The number of service managers is configured to manage a number of commands for executing a number of programs. Each of the number of service managers receives a command sent from a configuration module to execute a program in the number of programs, generates a control message having instructions to respond to the command received, and determines whether a token exists to allow the control message generated to be transmitted. The number of processors is configured to execute the number of service managers. Each of the processors in the number of processors is associated with a processor group in a number of processor groups. Each processor group in the number of processor groups has a processor executing a primary service manager. The primary service manager for the each processor group transmits the control message generated to a first processor unit to execute the program from the command.

Figure 3:
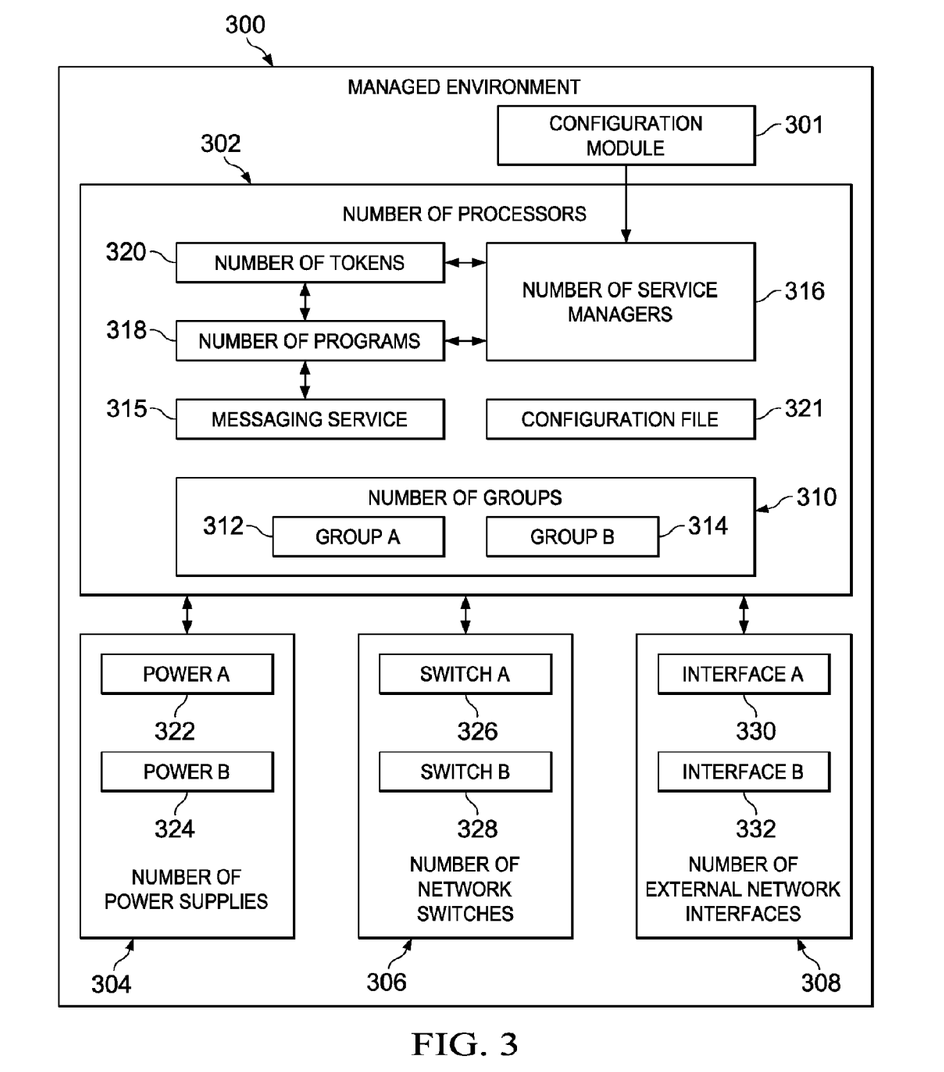
FIG. 3 is an illustration of a management environment in which an advantageous embodiment may be implemented.

With reference now to FIG. 3, an illustration of a management environment is depicted in which an advantageous embodiment may be implemented. Managed environment 300 may be implemented in a network environment, such as network data processing system 100 in FIG. 1, for example.

Managed environment 300 includes configuration module 301, number of processors 302, number of power supplies 304, number of network switches 306, and number of external network interfaces 308. Configuration module 301 controls the operational redundancies of the computing system within managed environment 300. Configuration module 301 may be, for example, without limitation, a user interface having hardware and/or software components that provide an operator with a capability to give input to manipulate the computing system and receive output indicating the effects of the operator input. An operator may be, for example, without limitation, a human, a computer program, another computing system, and/or any other suitable operator.

Number of processors 302 may be implemented using data processing system 200 in FIG. 2, for example, where each processor in number of processors 302 is a data processing system. Number of processors 302 may be implemented in, or associated with, number of groups 310. Group A 312 and group B 314 are illustrative examples of one implementation of number of groups 310. A subset of processors from number of processors 302 that belong to group A 312 are different from the subset of processors from number of processors 302 that belong to group B 314, in an illustrative example.

Each processor in number of processors 302 includes a service manager from number of service managers 316. A service manager is a task daemon that manages a redundancy scheme implemented in managed environment 300 by configuration module 301. Number of service managers 316 are executable on number of processors 302. Configuration module 301 is in communication with number of service managers 316 to control operational redundancies of the computing system within managed environment 300. Number of service managers 316 manage a number of commands received from configuration module 301. The number of commands operate to execute number of programs 318 on one or more of number of processors 302. Number of tokens 320 is one or more tokens associated with one or more programs from number of programs 318 and/or one or more service managers from number of service managers 316.

In an illustrative example, there is one primary program for each group of processors executing multiple instances of the program, such as number of groups 310. In this example, group A 312 has a processor executing the primary program with an associated token from number of tokens 320, and group B 314 has a processor executing the primary program with an associated token from number of tokens 320. A primary program is the first program to start running, or the oldest running program in time, for example. Likewise, group A 312 has a processor executing a primary service manager and group B 314 has a processor executing a primary service manager. The first program to start running in a group of processors has a token from number of tokens 320. The oldest, or first program to start running, is the primary program in the group of processors executing multiple instances of the program. The primary program, having the token, responds to service requests.

Number of service managers 316 also uses a token to determine which service manager is the primary service manager. The primary service manager controls the execution of programs, such as number of programs 318, for example. Each service manager is capable of being configured as a primary service manager adapted to manager the number of commands received from configuration module 301. A token from number of tokens 320 associated with a service manager from number of service managers 316 designates the service manager with the associated token as the primary service manager for the processor group in which the service manager is executing, for example.

Number of processors 302 includes messaging service 315 that arbitrates between number of service managers 316 and number of programs 318 to decide which service manager and/or which program is allowed to send out messages in response to messages or commands received, based on the presence of a token. Messaging service 315 is a subroutine library used by both number of service managers 316 and number of programs 318. Messaging service 315 provides both broadcast and unicast message services among and between computer programs, such as number of service managers 316 and number of programs 318, that join one or more interest groups. Number of service managers 316 uses a common interest group to arbitrate their token. Number of programs 318 may use their own interest group to arbitrate their token as well.

In an illustrative example, each program in number of programs 318 may have its own arbitration bus. When a program from number of programs 318 initiates an instance of a token message service class, the program specifies an arbitration message bus in which the program desires to participate. All of the programs participating in a given arbitration bus contend for a single token that controls which program actually sends messages, in this illustrative example.

In another illustrative example, each service manager may have a number of arbitration buses. In this illustrative example, each service manager may have an arbitration bus for the command module and an arbitration bus for the control module, as described in more detail in FIG. 4 below. The service manager that has the token has both the command and control token, in this illustrative example.

Messaging service 315 allows a message to go out for the primary program with the token, but blocks the other programs outgoing messages. If a primary program is no longer running, the messaging service then arbitrates between remaining programs to find the next oldest, assigns the token to the next oldest program and allows that program to be the primary program releasing messages. This provides redundancy management for number of service managers 316 and number of programs 318 executing on number of processors 302. The service managers selected to perform the command are chosen in a manner that protects the computing system from exposure to single points of failure.

Number of processors 302 is associated with number of power supplies 304, number of network switches 306, and number of external network interfaces 308. Similar to number of groups 310 for number of processors 302, a subset of processors from number of processors 302 is associated with power A 322 from number of power supplies 304 while a different subset of processors from number of processors 302 is associated with power B 324 from number of power supplies 304, for example. If power failure occurs in power A 322, different processors associated with power B 324 remain running and executing instances of the programs that are no longer running on the processors associated with power A 322, for example.

Switch A 326 and switch B 328 may be illustrative examples of one implementation of number of network switches 306. Interface A 330 and interface B 332 may be illustrative examples of number of external network interfaces 308. The processors associated with switch A 326 may be different than the processors associated with switch B 328. The processors associated with interface A 330 may be different than the processors associated with interface B 332.

If a processor from number of processors 302 fails, remaining processors continue executing instances of a program running and number of service managers 316 initiates a restart of an instance of the program running on another processor in the same group as the processor that failed, for example. The hardware implementation of number of processors 302, number of power supplies 304, number of network switches 306, and number of external network interfaces 308 is identified to number of service managers 316 for use in starting and restarting instances of number of programs 318 in the appropriate groups and/or on the appropriate processors.

The hardware implementation of management environment 300 is identified in configuration file 321. Configuration file 321 may be provided at design time by a system architect, for example. Configuration file 321 may be stored at configuration module 301, in one illustrative example. In another illustrative example, configuration file 321 may be stored locally on each processor in number of processors 302. In yet another illustrative example, configuration file 321 may be stored remote from number of processors 302 and configuration module 301 and accessible to number of processors 302 over a network, such as network 102 in FIG. 1. Number of service managers 316 uses configuration file 321 to identify the hardware implementation and determine the groupings present in management environment 300.

The illustration of management environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
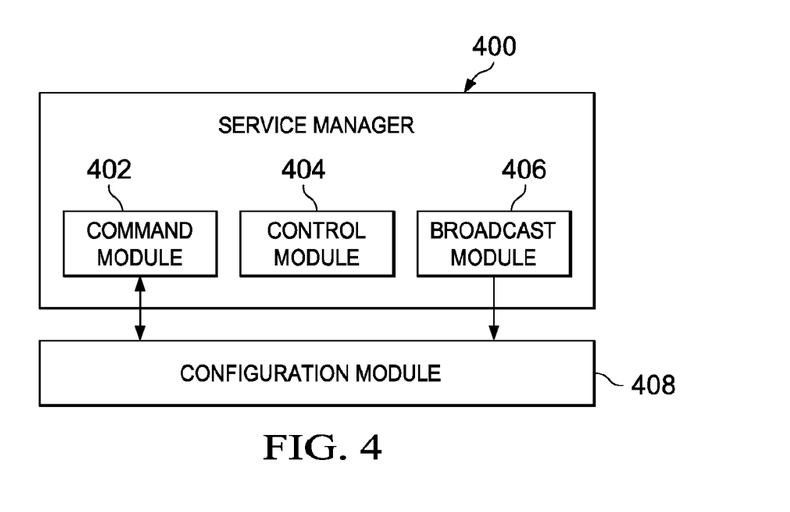
FIG. 4 is an illustration of a service manager in accordance with an advantageous embodiment.

With reference now to FIG. 4, an illustration of a service manager is depicted in accordance with an advantageous embodiment. Service manager 400 is an illustrative example of one implementation of number of service managers 316 in FIG. 3.

Service manager 400 includes command module 402, control module 404, and broadcast module 406. Command module 402 and control module 404 may be implemented as a token message server, in one illustrative example. Command module 402 determines whether service manager 400 is the primary service manager in a cluster of service managers. Command module 402 may receive a command from configuration module 408, for example, prompting the determination of whether service manager 400 is the primary service manager. If command module 402 determines that service manager 400 is the primary service manager, identified by associated with a token, then command module 402 responds to the command received and sends a control message to control module 404.

Redundancy management of number of programs 318 in FIG. 3 is enabled by a pre-defined configuration file, such as configuration file 321 in FIG. 3. The pre-defined configuration file specifies a number of groups, such as number of groups 310 of number of processors 302 in FIG. 3, where a group is determined based on a common single point of failure. The pre-defined configuration file also specifies redundancies, where two or more groups are listed under a common name, with the selection of groups made to mitigate the single points of failure of an individual group. In the process of running a program, a service manager will use the specified redundancy from a configuration file to start an instance of the program running on a processor from each group, for example. The process by which this mechanism may be used is described below.

A command message is a user command, input by a user or operator using a configuration module for example, and received by all service managers in a cluster, or number of service managers. The service managers send control messages to implement the command message received, based on the redundancy or group definition, as identified using a configuration file, for example. Due to the token arbitration, only one service manager actually sends the control messages. In an illustrative example, if a user inputs a command message to "using power start planner program," the token service manager will use the redundancy identified in configuration file 321 of FIG. 3 as "power" to send two control messages: "with power_A start planner program" and "with power_B start planner program." These two control messages will go to each of the processors selected with groups power_A and power_B, for example.

Control module 404 executes the control message received from configuration module 408. The control message may be, for example, to start an instance of a program. Broadcast module 406 is a message transceiver that allows service manager 400 to respond to configuration module 408 even if service manager 400 is not the primary service manager. Broadcast module 406 allows all service managers to respond to user requests that have no bearing on management or redundancy. An illustrative example of a response provided by broadcast module 406 may be a response to a status request.

The illustration of service manager 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
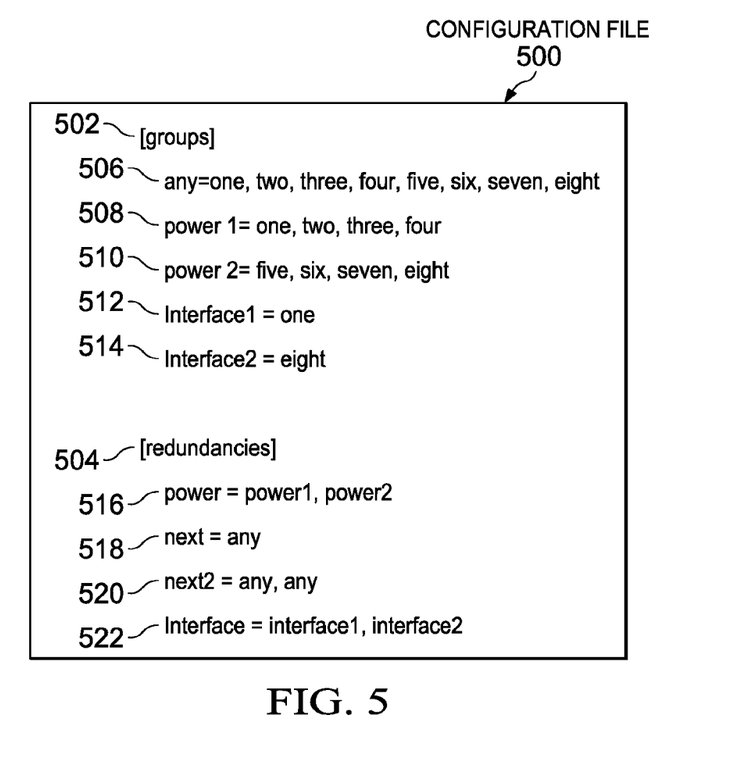
FIG. 5 is an illustration of a configuration file in accordance with an advantageous embodiment.

With reference now to FIG. 5, an illustration of a configuration file is depicted in accordance with an advantageous embodiment. Configuration file 500 is an illustrative example of one implementation of configuration file 321 in FIG. 3.

Configuration file 500 includes groups 502 and redundancies 504. Groups 502 illustrate one example of a number of groups, where a group is determined based on a common single point of failure. In this illustrative example, groups 502 depict any 506 as the collection of processors within the number of groups, in this case processors one through eight. The group power1 508 includes processors one, two, three, and four. The group power2 510 includes processors five, six, seven, and eight. Interface1 512 is associated with processor one, while interface2 514 is associated with processor eight.

Configuration file 500 also specifies redundancies 504, where two or more groups are listed under a common name, with the selection of groups made to mitigate the single points of failure of an individual group. In this illustrative example, power 516 includes power1 and power2. Next 518 is an example of a named redundancy. For example, if next 518 is used to run instances of a program, the group "any" is used to select the host, or processor. In this example, using "next start program_A" would cause the service manager to issue one control command to a processor selected from group "any." Next2 520 is another example of a named redundancy, consisting of the groups "any" and "any." The effect of using "any" in the manner illustrated with next2 520 is that two hosts, or processors, are selected to start a program using the "next2" redundancy, chosen arbitrarily as indicated by group "any," in this example.

When a group is referenced to determine a processor, or host, upon which to execute a program, the mechanism consumes processors from the list in a round-robin manner, so the first reference to a group will get the first available processor and the second reference to a group will get the next available processor, and so on. In an illustrative example, where "using next2 start program_B" is the first command issued to the system using the group "any" and all processors are available, the primary service manager will start two instances of program_B, one instance on "processor one" and another instance on "processor two." The number of instances of a program started by the service manager is a function of how many groups are specified for the named redundancy.

Interface 522 includes interface1 and interface2, in this illustrative example. In another illustrative example, if "message processor" is the name of a program designed to service incoming messages from other systems, it might be started on the system with the command "using interface start message processor." This command may use the redundancy group "interface" to select processors for executing message processor, and in this illustrative example the processors selected from groups "interface1" and "interface2" would be processor one and eight, as illustrated in FIG. 6 below, for example.

The illustration of configuration file 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
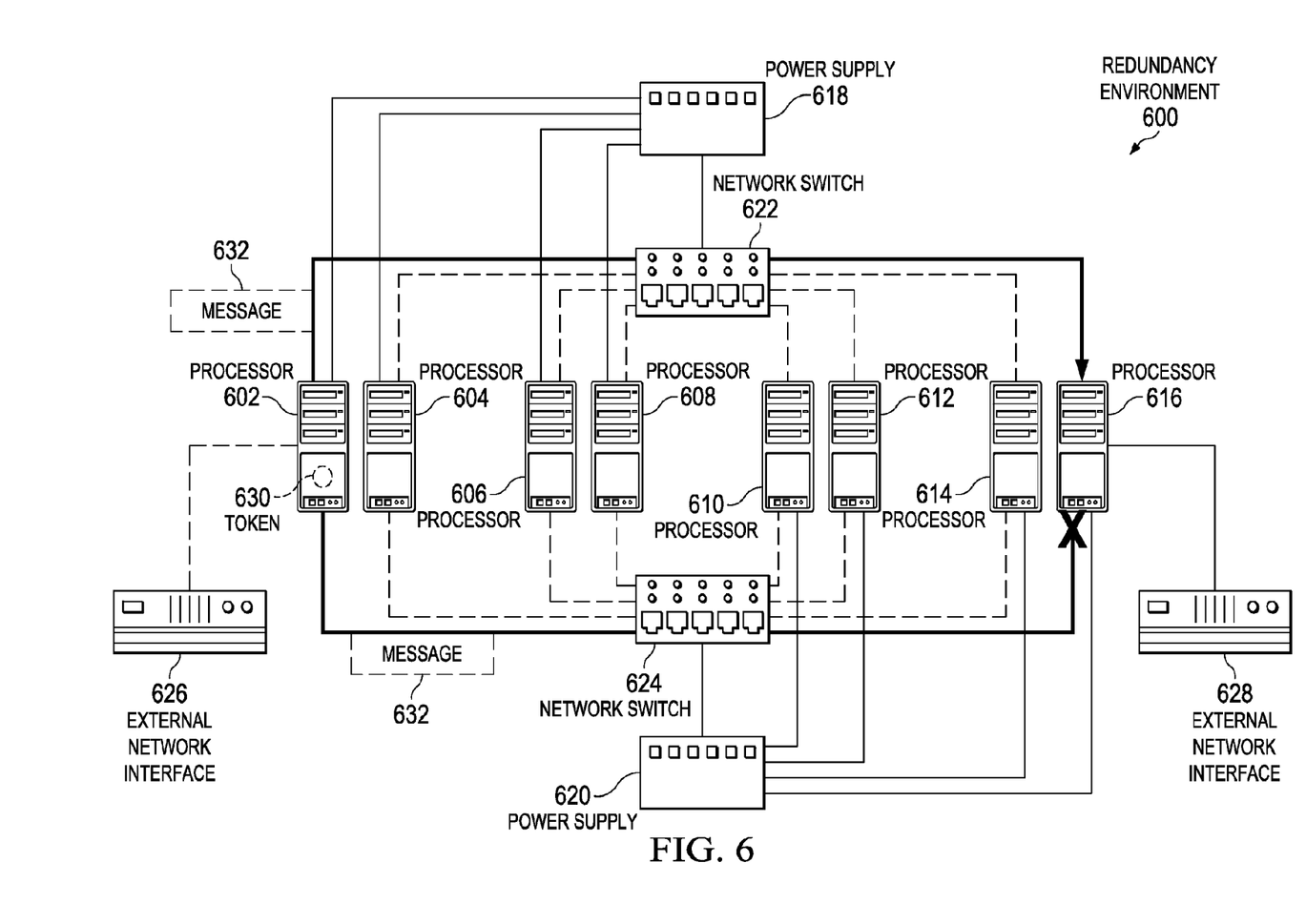
FIG. 6 is an illustration of a redundancy environment in accordance with an advantageous embodiment.

With reference now to FIG. 6, an illustration of a redundancy environment is depicted in accordance with an advantageous embodiment. Redundancy environment 600 is an illustrative example of one implementation of managed environment 300 in FIG. 3.

Redundancy environment 600 includes processor 602, processor 604, processor 606, processor 608, processor 610, processor 612, processor 614, and processor 616, which may be an illustrative example of one implementation of number of processors 302 in FIG. 3. Redundancy environment 600 includes power supply 618, power supply 620, network switch 622, network switch 624, external network interface 626, and external network interface 628. Power supply 618 and power supply 620 may be an illustrative example of one implementation of number of power supplies 304 in FIG. 3. Network switch 622 and network switch 624 may be an illustrative example of one implementation of number of network switches 306 in FIG. 3. External network interface 626 and external network interface 628 may be an illustrative example of one implementation of number of external network interfaces 308 in FIG. 3.

In this illustrative example, processor 602, processor 604, processor 606, and processor 608 are associated with power supply 618, external network interface 626, and both network switch 622 and network switch 624. Processor 610, processor 612, processor 614, and processor 616 are associated with power supply 620, external network interface 628, and both network switch 622 and network switch 624. In this example, processor 602, processor 604, processor 606, and processor 608 may be considered one subset group of processors, while processor 610, processor 612, processor 614, and processor 616 may be considered another subset group of processors.

Multiple instances of a program may be running on each of processor 602, processor 604, processor 606, processor 608, processor 610, processor 612, processor 614, and processor 616. Processor 602 is associated with token 630, designating the program executing on processor 602 the primary program among programs executing on processors 602, 604, 606, and 608. The program executing on processor 602 sends message 632 over both local area networks, both network switch 622 and network switch 624, to processor 616 in a different group of processors. Message 632 may be encoded with a unique identifier, in an illustrative example. The first instance of message 632 to reach processor 616 is kept, while any subsequent instances of message 632 are discarded by processor 616, as illustrated.

In this multipath communication scheme, the first to arrive is accepted and any additional duplicate messages are discarded. The unique identifier replicated over multiple instances of the same message enables the recipient program to identify a first received message and discard subsequent duplicates.

The illustration of redundancy environment 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
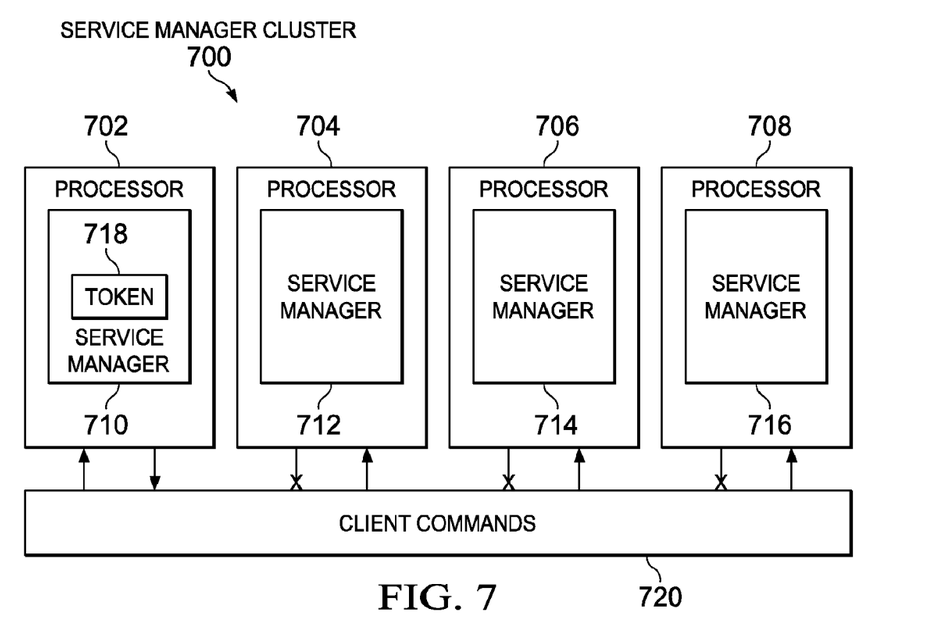
FIG. 7 is an illustration of a service manager cluster in accordance with an advantageous embodiment.

With reference now to FIG. 7, an illustration of a service manager cluster is depicted in accordance with an advantageous embodiment. Service manager cluster 700 is an illustrative example of one implementation of number of service managers 316 in FIG. 3.

Service manager cluster 700 includes processor 702, processor 704, processor 706, and processor 708. Service manager 710 executes on processor 702. Service manager 712 executes on processor 704. Service manager 714 executes on processor 706. Service manager 716 executes on processor 708.

Service manager 710 is associated with token 718. When client commands 720 are received by each of service manager 710, service manager 712, service manager 714, and service manager 716, only the response from service manager 710 is allowed to transmit from service manager cluster 700, a token 718 designates service manager 710 as the primary service manager.

Figure 8:
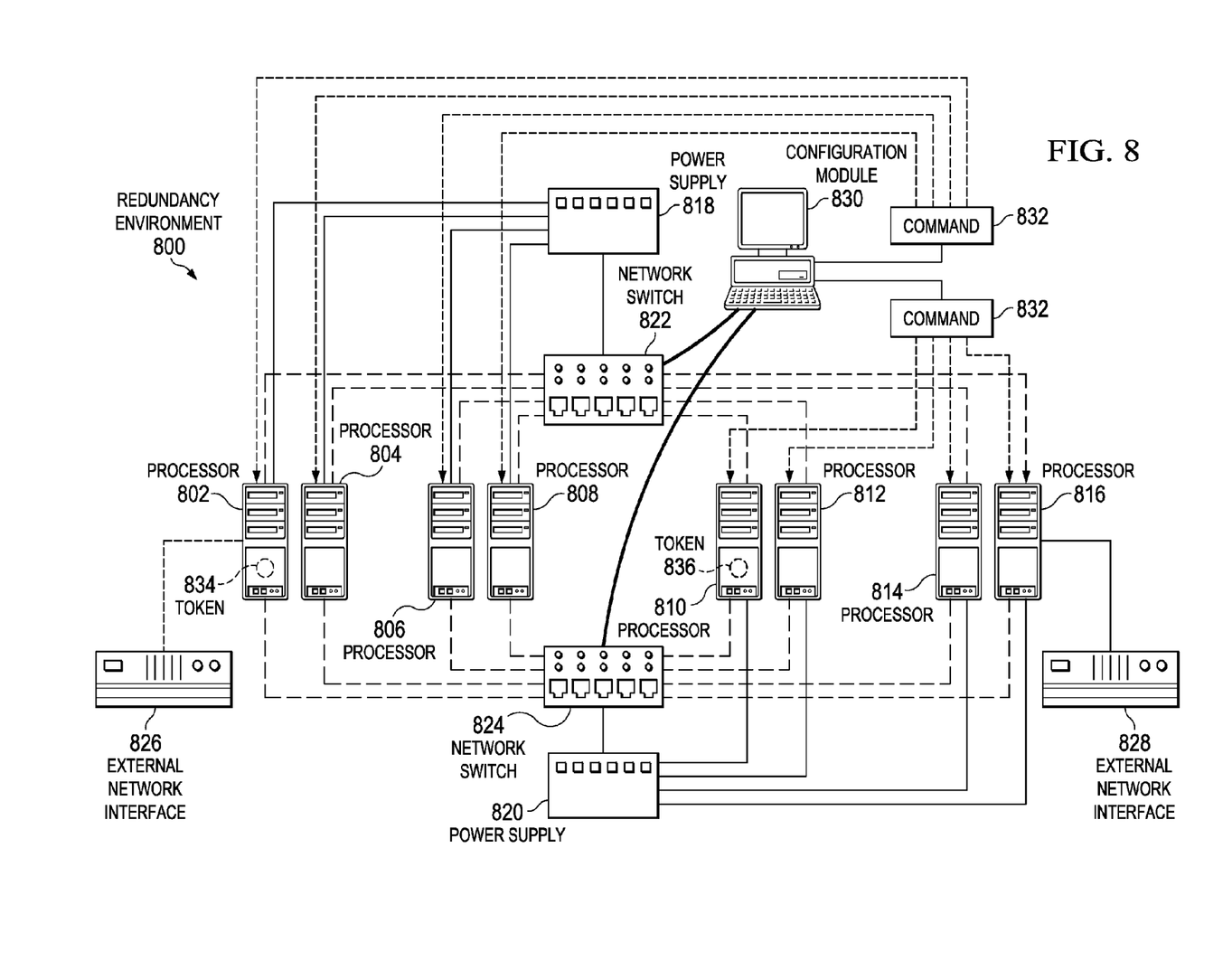
FIG. 8 is an illustration of a redundancy environment in accordance with an advantageous embodiment.

With reference now to FIG. 8, an illustration of a redundancy environment is depicted in accordance with an advantageous embodiment. Redundancy environment 800 is an illustrative example of one implementation of managed environment 300 in FIG. 3.

Redundancy environment 800 includes processor 802, processor 804, processor 806, processor 808, processor 810, processor 812, processor 814, and processor 816, which may be an illustrative example of one implementation of number of processors 302 in FIG. 3. Redundancy environment 800 includes power supply 818, power supply 820, network switch 822, network switch 824, external network interface 826, and external network interface 828.

In this illustrative example, processor 802, processor 804, processor 806, and processor 808 are associated with power supply 818, external network interface 826, and both network switch 822 and network switch 824. Processor 810, processor 812, processor 814, and processor 816 are associated with power supply 820, external network interface 828, and both network switch 822 and network switch 824. In this example, processor 802, processor 804, processor 806, and processor 808 may be considered one subset group of processors, while processor 810, processor 812, processor 814, and processor 816 may be considered another subset group of processors.

A service manager, such as service manager 400 in FIG. 4, is executed on each of processor 802, processor 804, processor 806, processor 808, processor 810, processor 812, processor 814, and processor 816. Configuration module 830 may send command 832 out to each service manager on processor 802, processor 804, processor 806, processor 808, processor 810, processor 812, processor 814, and processor 816. The command may be, for example, without limitation, to start a program.

Each service manager on processor 802, processor 804, processor 806, processor 808, processor 810, processor 812, processor 814, and processor 816 will try to send a command message to its control module to start the program. For example, the service managers executing on processor 802, processor 804, processor 806, and processor 808 may send a command message "with power supply 818 start program" while the service managers executing on processor 810, processor 812, processor 814, and processor 816 may send a command message "with power supply 820 start program." The service managers may use a configuration file to determine which groups and redundancies are in place, such as configuration file 500 in FIG. 5, for example.

However, only the primary service manager will actually send the start program command to the selected processors. In this illustrative example, the primary service manager for one group of processors is executed by processor 802, as designated by token 834, and the primary service manager for another group of processors in executed by processor 810, as designated by token 836.

As a result, redundant instances of the program are started on both processor 802 and processor 810, the processors executing the primary service managers for their group of processors. If processor 810 fails in the group of processors including processor 810, processor 812, processor 814, and processor 816, each service manager for each of processor 802, processor 804, processor 806, processor 808, processor 810, processor 812, processor 814, and processor 816 will detect the absence of the instance of the program and attempt to restart it for the group that failed, for example with the command message "with power supply 820 start program." The primary service manager will be the next oldest service manager in the group, as designated by the token, and will send the command to restart the instance of the program to the selected host. In this example, if the service manager executing on processor 812 is the next oldest after the service manager on the failed processor 810, then token 836 will be associated with the service manager on processor 812, and the program will run on processor 812.

The result is redundant instances of the program running on separate processors in different hardware redundancy groups.

The illustration of redundancy environment 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claim is:

1. A system for redundancy management of a computing system, the system comprising:
   a plurality of processors associated with a plurality of processor groups, wherein at least two of the plurality of processors belongs to a given one of the plurality of processor groups;
   a corresponding plurality of service managers executable on the plurality of processors, each service manager capable of being configured as a primary service manager adapted to manage a plurality of commands, each command operative to execute a program on one or more of the plurality of processors;
   a configuration module in communication with the plurality of service managers to control operational redundancies of the computing system, wherein each primary service manager executes one or more programs on the one or more of the plurality of processors included in different processor groups of the plurality of processor groups;
   a plurality of network switches configured to provide communication between the plurality of processors in the different processor groups of the plurality of processor groups; and
   a plurality of external network interfaces, wherein one of the plurality of processor groups are associated with a corresponding external network interface from the plurality of external network interfaces;
   wherein the program executing on a processor in a first processor group of the plurality of processor groups sends a message to a second processor of a second processor group using each of the plurality of network switches to form a plurality of instances of the message, wherein the message is encoded with a unique identifier, and wherein a first instance of the message received by the second processor is kept and subsequent instances of the message received by the second processor are discarded based on the unique identifier.

2. The system of claim 1 further comprising:
   a number of tokens associated with at least one of the plurality of service managers executing on the plurality of processors, wherein the number of tokens designate primary service managers.

3. The system of claim 1 further comprising:
   a number of tokens associated with at least one of the plurality of programs executing on the one or more of the plurality of processors, wherein the number of tokens designate primary programs.

4. The system of claim 1, wherein each service manager in the plurality of service managers further comprises a command module, a control module, and a broadcast module.

5. The system of claim 4, wherein the command module receives a command message to start a program, determines whether a service manager associated with the command module is the primary service manager, and responsive to a determination that the service manager is the primary service manager, sends a control message to the control module to implement the command message received.

6. The system of claim 1, wherein a configuration file further defines the plurality of processor groups, and wherein the configuration file is located in at least one of a configuration module and the plurality of processors.

7. A method for redundancy management, the method comprising:

receiving, by a service manager executing on a processor, a command sent from a configuration module;

generating, by the processor, a control message having instructions to respond to the command received;

determining, by the processor, whether a token exists to allow the control message generated to be transmitted, wherein the token designates the service manager as a primary service manager; and responsive to a determination that the token exists, transmitting, by the processor, the control message to a control module of the service manager, wherein the control message is encoded with a unique identifier, and wherein a first instance of the control message received by a second processor is kept and subsequent instances of the control message received by the second processor are discarded based on the unique identifier.

8. The method of claim 7 further comprising:

executing the instructions from the control message to execute a program on a processor unit, wherein the processor unit is selected using a token arbitration scheme.

9. The method of claim 8, wherein the program is an instance of a program.

10. The method of claim 8, wherein the processor unit selected to start the program is selected using defined redundancies of a configuration file.

11. The method of claim 7 further comprising:

executing the instructions from the control message to restart a program on a processor unit, wherein the processor unit is selected using a token arbitration scheme.

12. The method of claim 11, wherein the processor unit selected to restart the program is selected using defined redundancies of a configuration file.

13. The method of claim 7, wherein the command sent from the configuration module is received by a number of service managers executing on a number of processors in a number of processor groups, wherein each of the number of service managers perform the generating and determining steps, wherein each processor group in the number of processor groups includes a processor executing the primary service manager for the each processor group, and wherein the primary service manager for the each processor group performs the transmitting step.

14. A system for dynamic allocation of programs based on redundancy groups, the system comprising:

a plurality of service managers configured to manage a plurality of commands for executing a plurality of programs, wherein each of the plurality of service managers receives a corresponding command sent from a configuration module to execute a program in the plurality of programs, generates a control message having instructions to respond to the command received, and determines whether a token exists to allow the control message generated to be transmitted;

a plurality of processors configured to execute the plurality of service managers, wherein each of the processors in the plurality of processors is associated with a corresponding processor group in a plurality of processor groups, wherein a given processor group in the plurality of processor groups has a processor executing a corresponding primary service manager, and wherein the primary service manager for the given processor group transmits the control message generated to a first processor unit to execute the program from the command, wherein the control message is encoded with a unique identifier, and wherein the first processor unit is further configured such that a first instance of the control message received is kept and subsequent instances of the control message received by the first processor are discarded based on the unique identifier.

15. The system of claim 14, wherein the corresponding primary service manager for the given processor group is identified using a token arbitration scheme.

16. The system of claim 14, wherein the first processor unit selected to execute the program is selected using defined redundancies of a configuration file.

17. The system of claim 14, wherein a given primary service manager for the given processor group further executes the instructions from the control message to restart the program on a second processor unit, wherein the first processor unit is unavailable and the second processor unit is selected using a token arbitration scheme.

18. The system of claim 14 further comprising:

a messaging service configured to arbitrate between the plurality of service managers and the plurality of programs to determine primary service managers and primary programs.

* * * * *